No. 614,829. Patented Nov. 29, 1898.
C. BROWN.
DENTAL ENGINE.
(Application filed Mar. 18, 1898.)
(No Model.)
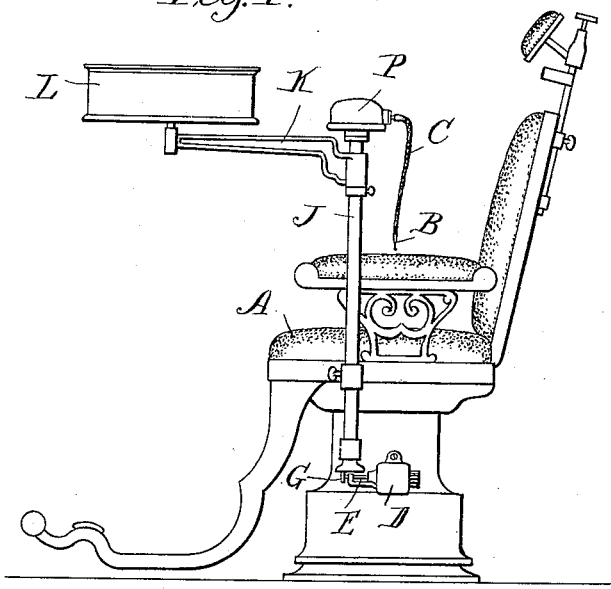
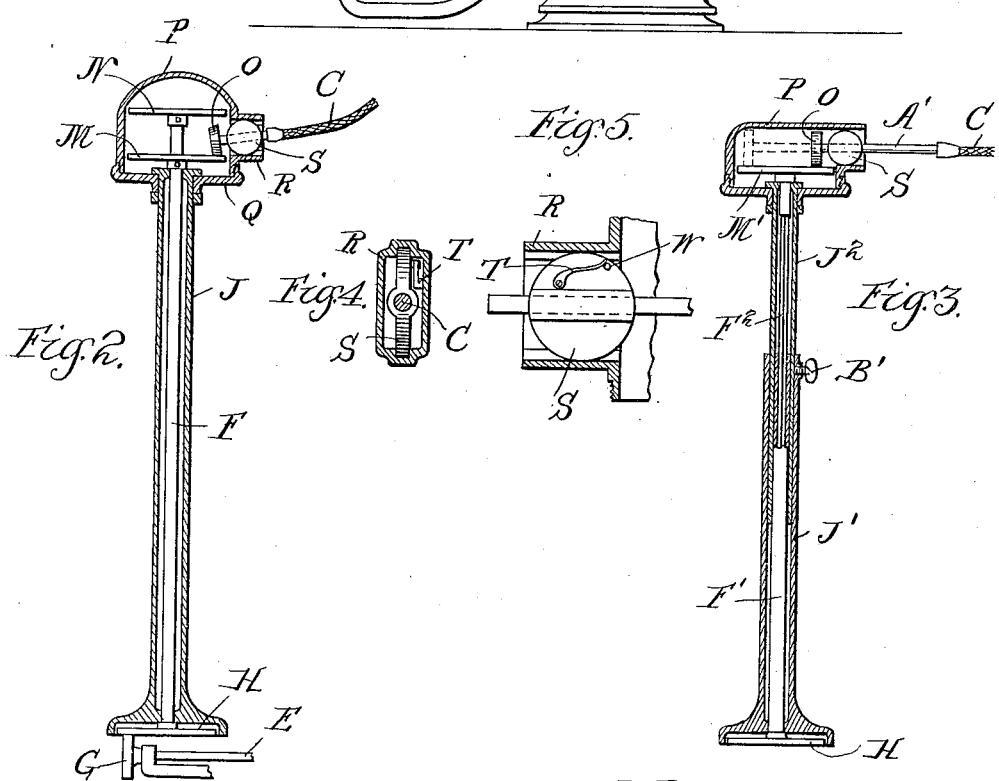
Witnesses.
W. M. Rheem.
E. C. Semple.
Inventor
Charles Brown
by Brown & Darby
Atty's

UNITED STATES PATENT OFFICE.

CHARLES BROWN, OF CHICAGO, ILLINOIS, ASSIGNOR OF ONE-HALF TO LOUIS C. DANZEL, OF SAME PLACE.

DENTAL ENGINE.

SPECIFICATION forming part of Letters Patent No. 614,829, dated November 29, 1898.

Application filed March 18, 1898. Serial No. 674,287. (No model.)

*To all whom it may concern:*

Be it known that I, CHARLES BROWN, a citizen of the United States, residing at Chicago, in the county of Cook and State of Illinois, have invented a new and useful Dental Engine, of which the following is a specification.

This invention relates to dental engines.

The object of the invention is to provide a simple and efficient arrangement of mechanism for operating dental tools and wherein overhead shafting and pulleys are avoided.

A further object of the invention is to provide means for operating dental tools which will permit of any desired change of location or movement of the dental chair.

Further objects of the invention will appear more fully hereinafter.

The invention consists, substantially, in the construction, combination, location, and relative arrangement of parts, all as will be more fully hereinafter set forth, as shown in the accompanying drawings, and finally specifically pointed out in the appended claims.

Referring to the drawings and to the various views and reference-signs appearing thereon, Figure 1 is a view in side elevation of the dental chair, showing the application and relative arrangement of means for operating the dental tool applied thereto. Fig. 2 is a detached detail view, in central longitudinal section, of the hollow standard and shaft by which motion is transmitted to the dental tool. Fig. 3 is a similar view of the same, showing a modified arrangement embodying the principles of the invention. Fig. 4 is a sectional detail view showing the manner of mounting the dental tool to receive rotation. Fig. 5 is a broken sectional detail view of the construction shown in Fig. 4 in a plane at right angles with respect thereto.

The same part is designated by the same reference-sign wherever it occurs throughout the several views.

In the drawings, reference-sign A designates a dental chair, which may be of any suitable, convenient, or desirable construction and arrangement.

B is the dental tool, which is attached to the free end of a flexible shaft or power-transmitter C in the usual and ordinary manner. Of course it will be readily understood that the tool B may be readily removed and replaced when desired by other forms of tools, as is common in the art.

In one form of apparatus heretofore employed it has been the practice to transmit power to the dental tool through a system of overhead pulleys and shafting from a distant source of power. Such practice is objectionable for the reason that through the shafting and belts and pulleys necessary a large amount of power is lost, and, moreover, such arrangement necessitates the location of the dental chair in one place in the room, and such location cannot be changed without trouble and annoyance in rearranging the belting and pulleys of the driving apparatus for the dental tool. It has heretofore been endeavored to overcome this objection by providing a motor and mounting the same upon a wall-bracket in convenient location with reference to the chair. This arrangement, however, is not entirely satisfactory for the reason that the dental chair must always occupy a fixed relative position with respect to the wall-bracket which supports the motor.

It is also a common practice to provide an apparatus arranged to be operated by foot-treadle power and which is wholly independent of the chair. This style of machine is open to the objection that the care and attention of the operator are required in effecting an operation of the engine, thus detracting so much from the concentration of attention upon the dental operations. It has also been endeavored to operate the dental tool by means of a motor on the chair geared to the dental-tool shaft through belt-gearing. This is not wholly satisfactory, because the belts stretch and slip, and hence rapidly become unreliable in operation.

It is the purpose of the present invention to avoid the objections noted and to provide a construction and arrangement which is attached to and is carried by the chair, thus imposing no restrictions or limitations upon the movements or location of the chair, and hence enabling the operator to place the chair in any convenient or desirable location in the room to secure varying advantages of light, and whereby the location of the chair may be altered or changed at will without interfering with the apparatus through which the dental tool is operated, and wherein the care and attention of the operator are not required in actuating the tool, thus enabling undivided attention to be devoted to the work in hand, and wherein the driving of the tool is effected directly and with uniform positiveness.

In carrying out the invention I provide a motor D of suitable construction and arrangement and suitably mount the same upon the chair at any convenient point. Rotation is imparted from the shaft E of motor D to the flexible shaft or power-transmitter C, to which the dental tool is attached, through a shaft F, by means of suitable gears G H. These gears may be of any suitable construction or relative arrangement. In the form shown said gears comprise friction-disks arranged to suitably engage with each other, the gear G on shaft E of motor D being arranged to engage frictionally on the periphery thereof with the face of disk H, said disk H being mounted upon shaft F.

It is customary to provide dental chairs with a standard or bracket J, upon which is supported, by means of a bracket K or otherwise, the tool-chest L, spittoon, or other object. In carrying out the principles of my invention and in order to economize space, and also in the construction of the apparatus, and at the same time securing neatness and compactness I utilize said standard J as an inclosing casing for shaft F, and to this end I form said standard J hollow or tubular, and I suitably journal shaft F therein. Upon the upper end of shaft F is mounted one or more driving-gears, as shown. In the form shown in Fig. 2 I mount on the upper end of shaft F two disks M N, spaced a suitable distance apart and adapted to receive in the space therebetween the pinion or gear O of flexible power-transmitter or shaft C. From this construction and arrangement it will be readily seen that when the pinion O is brought into frictional contact with the adjacent face of disk M during the rotation of such disk rapid rotation will be imparted to said pinion O, and hence to flexible shaft C and the dental tool B. Similarly when said pinion O is moved into engagement with the face of disk N rotation will be imparted to said pinion O, shaft C, and tool B in the opposite direction.

In order to protect the engaging surfaces of disks M N from dust or the like and to provide a suitable ornamental finish, I inclose said disk in a hood or cap P, suitably formed with or secured to a flanged collar Q, swiveled upon the upper end of standard or casing J, so as to revolve freely therearound. The portion of flexible shaft C which carries pinion O is suitably journaled in cap P. The manner of mounting this pinion and its supporting-shaft in said cap may be altered or varied in many ways without departure from the spirit or scope of my invention. In the drawings I have shown a convenient and efficient manner of mounting this pinion and journaling its supporting-shaft, and wherein cap P is provided with an extension R, in which is journaled or mounted to rotate a disk S. A journal-bearing is formed diametrically through such disk S, and in such journal-bearing is arranged to be received the portion of shaft C which carries pinion O. Disk S is mounted in extension R so as to revolve in a vertical plane, whereas driving-disks M N are mounted to rotate in horizontal planes. From this construction it will be seen that by axially rotating journal-disk S in its seat in extension R pinion O may be brought or moved into contact with the approximate face of disk M or N, according to the direction in which journal-disk S is axially rotated. In the form shown disks M and N are designed to rotate pinion O through frictional contact with the periphery of such pinion, though it is obvious that other forms of gear-wheels or disks may be employed without departure from the spirit or scope of the invention. If desired, and in order to normally hold pinion O in such position as to be out of contact with the face of both disks M and N, I mount in extension R a spring T, arranged to bear upon a suitable notch or projection—such, for instance, as a pin W—on journal-disk S, the normal tendency of such spring being to yieldingly hold pinion O out of engagement or peripheral contact with both disks M N, but permitting a slight rocking movement of such journal-disk S in order to permit peripheral contact of such pinion O with either of said disks M N, according to the direction in which such journal-disk is rocked. Thus when the operator desires to use the dental tool a slight rocking movement imparted to journal-disk S will cause the peripheral engagement of pinion O with disk M or N, as the case may be, thus imparting rapid rotation to the tool.

Of course it will be understood that any desired relative speeds of rotation of pinion O and shaft F may be secured by suitably and properly proportioning the relative diameters of disks M N and pinion O and the distance of such pinion O from the axial center of said disks. It will also be seen from the foregoing description that through the swiveling of cap P upon standard or casing J the flexible shaft C and its driving-gearing may be rocked or swung to any position that may be desired or required in the exigencies of use.

In order to secure a proper peripheral engagement of pinion O with disks M or N and at the same time to permit said pinion to be moved into or out of peripheral engagement with said disks, said pinion may be slightly cone-shaped, as clearly shown in Fig. 2. This, however, is a detail of mechanics, and the invention is not limited or restricted to such feature.

In Fig. 3 is shown a slightly-modified arrangement wherein the driving-shaft carries only one driving-disk M' at its upper end, and pinion O, carried by flexible shaft C, is arranged upon the journaled portion of such flexible shaft, so as to be moved back and forth transversely across the face of disk M', the speed of rotation of such pinion and flexible shaft being varied as required or desired by moving said disk nearer to or farther from the axis of rotation of such disk M' and a reversal of the direction of rotation of pinion O being secured by shifting such pinion from one side or axis of rotation of disk M' to the other side of such axis, as indicated in dotted lines in Fig. 3. In this form of the invention the portion A' of flexible shaft C which carries pinion O is extended in length a sufficient amount to be readily and easily slid back and forth through its journal-bearing in journal-disk S.

In order to secure a desirable vertical adjustment of the dental tool, standard or casing J may be made in telescoping sections, as indicated at J' and $J^2$, Fig. 3, the section $J^2$ being held at any suitable point of adjustment by means of set-screw B', and similarly and for a similar purpose shaft F is also made in telescoping sections, as indicated at F' $F^2$, Fig. 3.

From the foregoing description it will be seen that I provide an exceedingly simple and efficient arrangement of apparatus for operating dental tools, and wherein is employed the standard or support which it is customary to supply upon dental chairs for supporting the cuspidor or tool-chest, thus economizing in the cost of construction and arrangement of the apparatus and at the same time securing compactness and neatness in appearance. It will also be seen that efficient means are provided for operating the tool while permitting the location of the chair to be changed at will without affecting or disarranging the driving apparatus of the dental tool.

While I have shown and described a specific construction and arrangement of apparatus embodying the principles of the invention, I desire it to be understood that the invention is not limited or restricted to the exact details of construction and arrangement shown and described, as many variations therein and changes therefrom would readily suggest themselves to persons skilled in the art and still fall within the spirit and scope of the invention; but, Having set forth the object and nature of my invention and an operative embodiment of means for carrying the same into practical and useful operation, what I claim as new and useful and of my own invention, and desire to secure by Letters Patent of the United States, is—

1. In an apparatus of the class described, a dental chair, a shaft journaled therein, a motor for driving said shaft, a disk carried by said shaft, an inclosing cap for said disk, a dental tool, a flexible shaft carrying such tool, a journal-disk in which said flexible shaft is journaled, said journal-disk mounted in said cap for axial movement, a driving-pinion mounted on said flexible shaft and arranged to engage said first-mentioned disk, and a spring arranged to yieldingly maintain said journal-disk in position to hold said pinion out of engagement with said first-mentioned disk; as and for the purpose set forth.

2. In an apparatus for operating dental tools, a dental chair, a hollow standard mounted thereon, said standard made in telescoping sections, a shaft journaled in said standard, said shaft also made in telescoping sections, a motor carried by the chair and arranged to actuate said shaft, a driving-disk mounted on said shaft, an inclosing cap for said driving-disk, a journal-disk pivotally mounted in said cap, a dental tool, an actuating-shaft therefor, said shaft journaled in said journal-disk for longitudinal movement relative thereto, and a pinion mounted on said tool-shaft and arranged to engage and be driven by said driving-disk, as and for the purpose set forth.

3. In an apparatus for operating dental tools, a dental chair, a standard mounted thereon, a shaft journaled in said standard, a motor carried by the chair for rotating said shaft, a pair of separated driving-disks mounted on said shaft, a cap swivelly mounted on said standard and arranged to inclose said driving-disks, a journal-disk pivotally mounted on said cap, a dental tool, a flexible driving-shaft therefor, said shaft journaled in said pivotally-mounted journal-disk for longitudinal movement relative thereto, and a pinion mounted on said tool-shaft and arranged between said spaced driving-disks, whereby said pinion may be moved into or out of engaging relation with respect to either of said driving-disks, or toward and from the axis of rotation thereof, as and for the purpose set forth.

In witness whereof I have hereunto set my hand, this 16th day of March, 1898, in the presence of the subscribing witnesses.

CHARLES BROWN.

Witnesses:
S. E. DARBY,
E. C. SEMPLE.